(12) United States Patent
Okuda et al.

(10) Patent No.: US 9,344,599 B2
(45) Date of Patent: May 17, 2016

(54) IMAGE FORMING SYSTEM, PORTABLE TERMINAL, AND RECORDING MEDIUM THAT FACILITATES OPERATION PROCEDURE FOR DISPLAYING PREVIEW IMAGE OF BACK SIDE IN DUPLEX PRINTING

(71) Applicant: KYOCERA Document Solutions Inc., Osaka (JP)

(72) Inventors: Masaya Okuda, Osaka (JP); Satoshi Kawakami, Osaka (JP); Yoshitaka Matsuki, Osaka (JP); Yuri Moritani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/667,141

(22) Filed: Mar. 24, 2015

(65) Prior Publication Data

US 2015/0281510 A1 Oct. 1, 2015

(30) Foreign Application Priority Data

Mar. 26, 2014 (JP) .................................. 2014-064390

(51) Int. Cl.
| | |
|---|---|
| *G06F 15/00* | (2006.01) |
| *H04N 1/23* | (2006.01) |
| *G06F 3/12* | (2006.01) |
| *H04N 1/00* | (2006.01) |
| *G06F 3/0484* | (2013.01) |

(52) U.S. Cl.
CPC ............ *H04N 1/2369* (2013.01); *G06F 3/0484* (2013.01); *G06F 3/1208* (2013.01); *G06F 3/1256* (2013.01); *G06F 3/1292* (2013.01); *H04N 1/0044* (2013.01); *H04N 1/00493* (2013.01); *H04N 2201/0039* (2013.01); *H04N 2201/0055* (2013.01); *H04N 2201/0094* (2013.01)

(58) Field of Classification Search
CPC ............... H04N 2201/0055; H04N 2201/0039
See application file for complete search history.

(56) References Cited

U.S. PATENT DOCUMENTS

| | | | | |
|---|---|---|---|---|
| 2013/0201523 A1* | 8/2013 | Oka | ...................... | G06F 3/1292 358/1.15 |
| 2014/0002853 A1* | 1/2014 | Miyata | ............... | H04N 1/00482 358/1.15 |
| 2014/0002860 A1 | 1/2014 | Miyata | ......................... | 358/1.15 |

FOREIGN PATENT DOCUMENTS

JP 2014-11713 A 1/2014

* cited by examiner

*Primary Examiner* — Saeid Ebrahimi Dehkordy
(74) *Attorney, Agent, or Firm* — Stein IP, LLC

(57) ABSTRACT

An image forming system includes an image forming apparatus and a portable terminal. The image forming apparatus includes: a preview-image-data generating circuit that generates preview image data from image data; and a preview-image-data transmitting circuit that transmits the preview image data to the portable terminal. The portable terminal includes: a preview-image-data receiving circuit that receives the preview image data from the image forming apparatus via wireless communication; a preview-image display circuit that displays an image of the preview image data; and a rotation detecting circuit that detects rotation of a main body of the portable terminal with a predetermined rotation procedure. When the rotation detecting circuit detects rotation of the main body of the portable terminal while the image of the preview image data is displayed, the portable terminal displays an image of the preview image data corresponding to a back side of the displayed image.

8 Claims, 5 Drawing Sheets

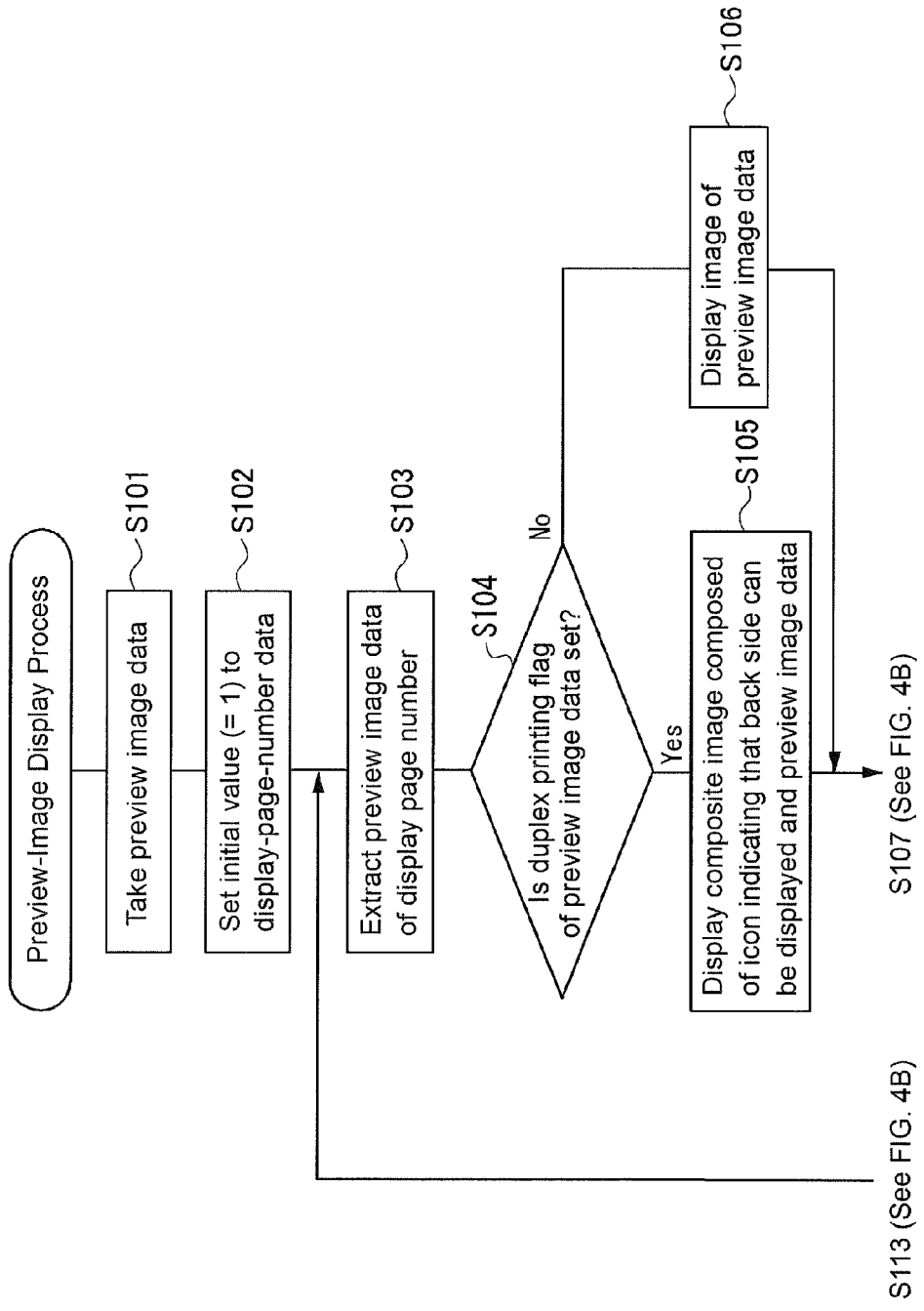

IMAGE FORMING SYSTEM, PORTABLE TERMINAL, AND RECORDING MEDIUM THAT FACILITATES OPERATION PROCEDURE FOR DISPLAYING PREVIEW IMAGE OF BACK SIDE IN DUPLEX PRINTING

INCORPORATION BY REFERENCE

This application is based upon, and claims the benefit of priority from, corresponding Japanese Patent Application No. 2014-064390 filed in the Japan Patent Office on Mar. 26, 2014, the entire contents of which are incorporated herein by reference.

BACKGROUND

Unless otherwise indicated herein, the description in this section is not prior art to the claims in this application and is not admitted to be prior art by inclusion in this section.

An image forming apparatus, which is a printer, a multifunction printer, or a multifunction peripheral, can transmit image data of a read document to a portable terminal such as a mobile phone, a smart phone, and a tablet terminal via wireless communication. The portable terminal can receive the image data from the image forming apparatus and display the image data on an operation panel of the portable terminal. For example, in one output processing program and output device (e.g. portable terminal), an output device such as a mobile phone displays the image of image data received from an image-data acquiring apparatus (e.g. image forming apparatus) on a panel of the output device. The operation for page turning for the image displayed on the panel of the output device can be achieved by the operation where a user tilts the output device with one hand. That is, when the user tilts the portable terminal, the page turning can be performed with respect to the image displayed on the panel of the portable terminal corresponding to the rotation direction of the tilting.

SUMMARY

An image forming system according to an aspect of the disclosure includes an image forming apparatus and a portable terminal. The image forming apparatus includes: a preview-image-data generating circuit that generates preview image data from image data; and a preview-image-data transmitting circuit that transmits the preview image data to the portable terminal. The portable terminal includes: a preview-image-data receiving circuit that receives the preview image data from the image forming apparatus via wireless communication; a preview-image display circuit that displays an image of the preview image data; and a rotation detecting circuit that detects rotation of a main body of the portable terminal with a predetermined rotation procedure. When the rotation detecting circuit detects rotation of the main body of the portable terminal while the image of the preview image data is displayed, the portable terminal displays an image of the preview image data corresponding to a back side of the displayed image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4A and 4B illustrate the procedure of a preview-image display process of the portable terminal according to the embodiment.

DETAILED DESCRIPTION

Figure 1:
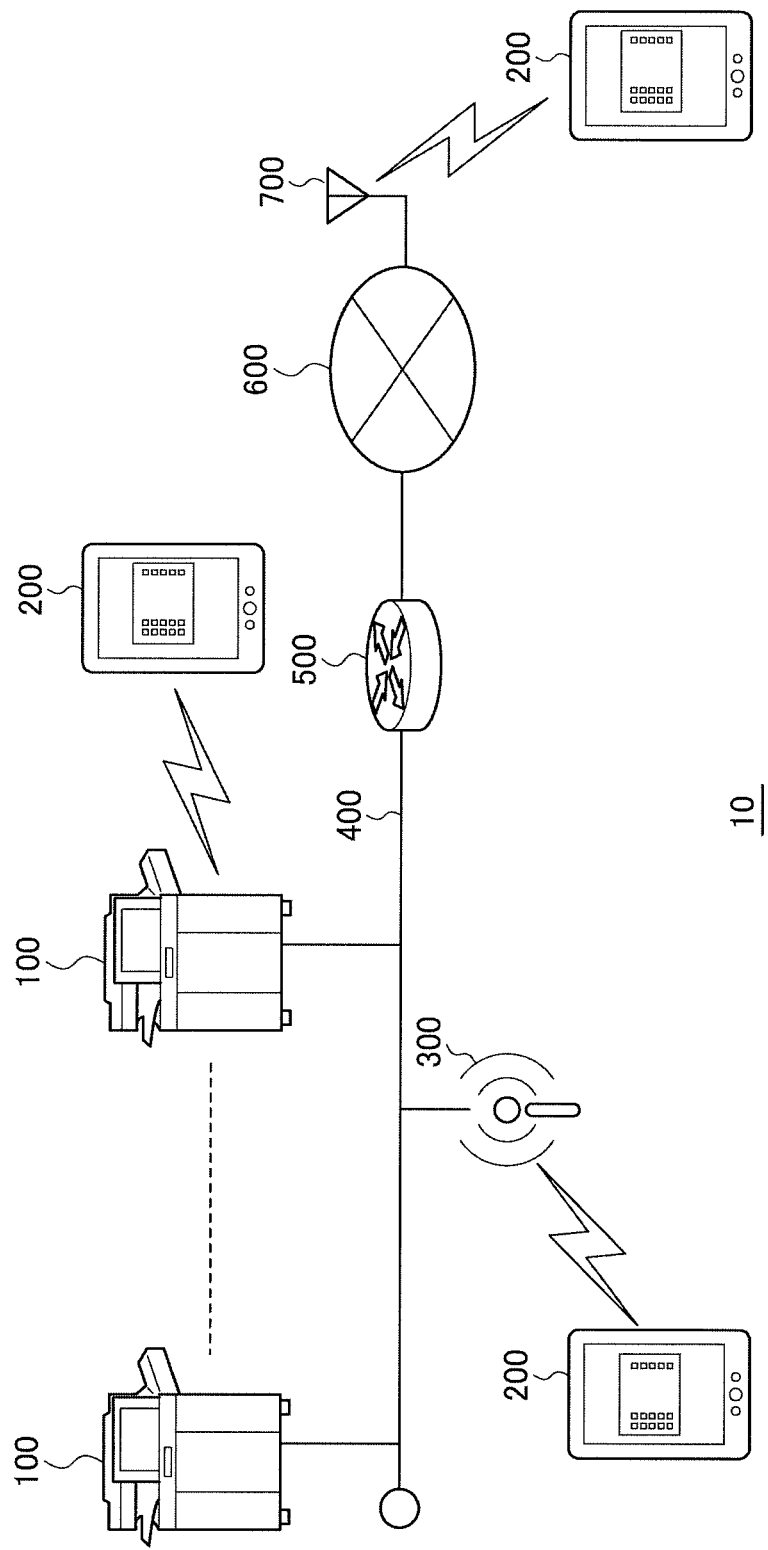
FIG. 1 illustrates a configuration of an image forming system according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, a description will be given of an embodiment of the disclosure with reference to the accompanying drawings. Here, a print image of an image received from an image forming apparatus is referred to as a "preview," and the image of a preview is referred to as a "preview image" below. In the embodiment, firstly, the image forming apparatus generates preview image data of the front side and the back side in duplex printing and transmits the preview image data to a portable terminal. Subsequently, when the portable terminal receives the preview image data, the portable terminal displays the preview image of the front side of the page by an operation of a user. Subsequently, the user rotates the portable terminal to display the preview image of the back side of the page.

Firstly, a description will be given of the system configuration of an image forming system 10 of this embodiment using FIG. 1. As illustrated in FIG. 1, the image forming system 10 includes a plurality of image forming apparatuses 100, a plurality of portable terminals 200, an access point 300, a network 400, a router 500, an Internet network 600, and an access point 700. The image forming apparatus 100 and the access point 300 are connected to the network 400. The network 400 is connected to the Internet network 600 via the router 500.

The image forming apparatus 100, which is a printer, a multifunction printer, or a multifunction peripheral, can transmit and receive data to/from the portable terminal 200 using a short-range wireless communication, the access point 300, or the Internet network 600.

The portable terminal 200, which is a mobile phone, a smart phone, a tablet terminal, or similar device, can transmit and receive data to/from the image forming apparatus 100 using a short-range wireless communication, the access point 300 of the network 400 or the access point 700 of the Internet network 600.

The access point 300 is connected to the network 400, and connects the portable terminal 200, which is issuing a connection request to the access point 300, to the network 400 via wireless communication.

The network 400 is a network such as a local area network (LAN), and the plurality of image forming apparatuses 100 and the access point 300 are connected to the network 400.

The router 500 is connected to the network 400, and connects the network 400 to the Internet network 600.

The Internet network 600 is an IP network such as the Internet and an intranet, and the plurality of portable terminals 200 are connected to the Internet network 600 via the access point 700.

Figure 2:
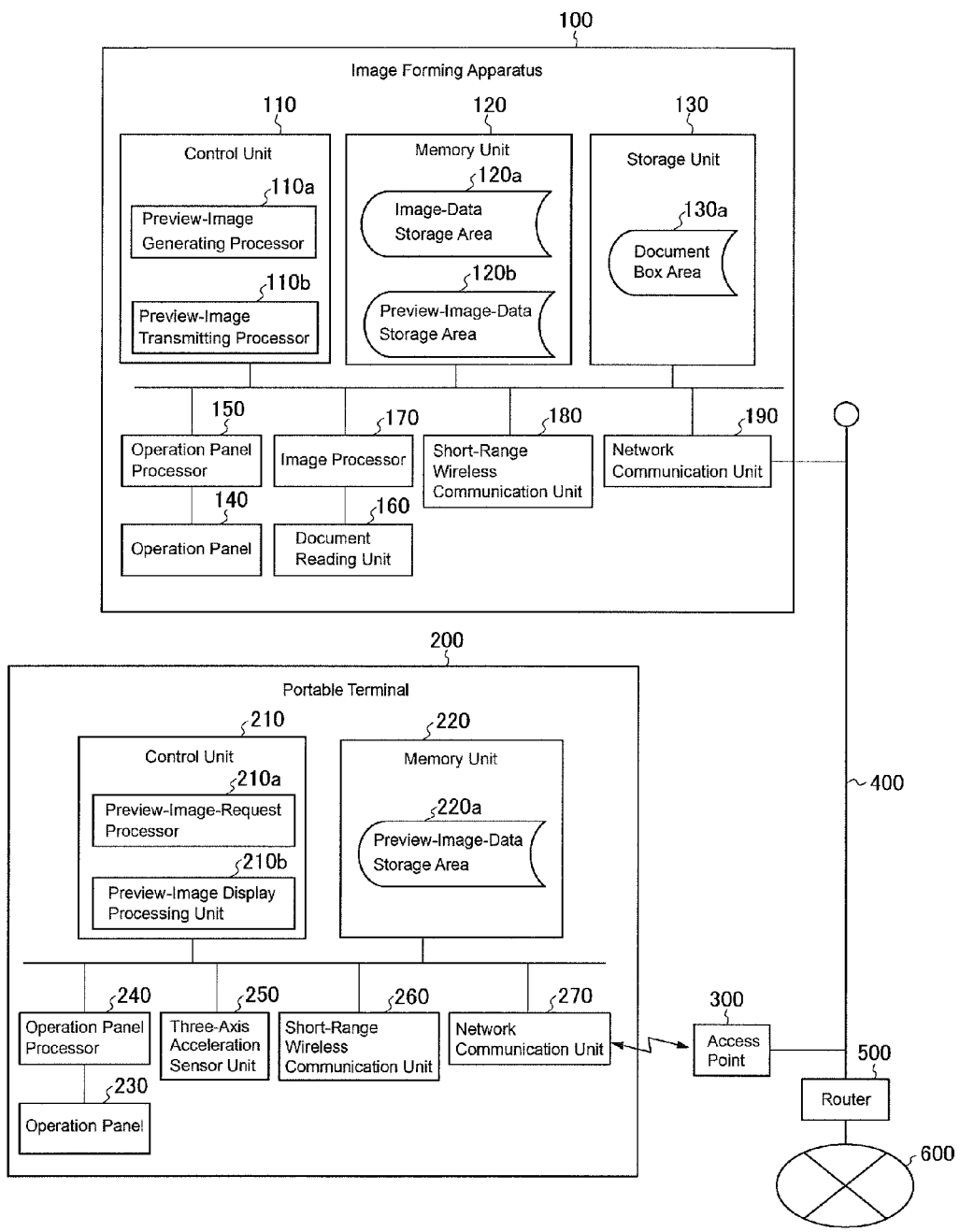
FIG. 2 illustrates a functional configuration of an image forming apparatus and a portable terminal in the image forming system according to the embodiment.

Next, a description will be given of the functional configurations of the image forming apparatus 100 and the portable terminal 200 in the image forming system 10 using FIG. 2. The image forming apparatus 100 and the portable terminal 200, which are illustrated in FIG. 2, illustrate the functional configurations of one image forming apparatus 100, which connects to the network 400, and one portable terminal 200, which connects to the network 400 via the access point 300, in the image forming system 10 illustrated in FIG. 1. The other image forming apparatuses 100 and portable terminals 200 illustrated in FIG. 1 have the identical functional configurations.

Firstly, a description will be given of the functional configuration of the image forming apparatus 100. The image forming apparatus 100 illustrated in FIG. 2 includes a control unit 110, a memory unit 120, a storage unit 130, an operation panel 140, an operation panel processor 150, a document reading unit 160, an image processor 170, a short-range wireless communication unit 180, and a network communication unit 190. These units are connected to one another via a bus or similar member in the configuration. The control unit 110 includes a preview-image generating processor 110a (which is also referred to as preview-image-data generating unit) and a preview-image transmitting processor 110b (which is also referred to as preview-image-data transmitting unit). The memory unit 120 includes an image-data storage area 120a and a preview-image-data storage area 120b. The storage unit 130 includes a document box area 130a.

The control unit 110 is a circuit including a main storage unit, such as a RAM and a ROM, and a control unit such as a central processing unit (CPU). The control unit 110 performs an overall control of the image forming apparatus 100, including an interface such as various I/Os and a universal serial bus (USB), a bus controller, and similar member. The preview-image generating processor 110a takes the image data from the image-data storage area 120a, generates the preview image data from the taken image data, and stores the preview image data in the preview-image-data storage area 120b. When the preview-image generating processor 110a generates the preview image data from the image data of the front side or the back side in duplex printing, the preview-image generating processor 110a sets a duplex printing flag to the preview image data of the front side and the back side. The duplex printing flag indicates duplex printing. When the preview-image transmitting processor 110b receives a preview-image request notification from the portable terminal 200, the preview-image transmitting processor 110b takes the preview image data from the preview-image-data storage area 120b and transmits the preview image data to the portable terminal 200.

The memory unit 120 is an auxiliary storage device, such as a flash memory, and stores the program and the data of the process to be executed by the control unit 110. The image-data storage area 120a stores the image data read from the document reading unit 160 and the image data received from the other image forming apparatuses 100 and portable terminals 200 via the network communication unit 190. The preview-image-data storage area 120b stores the preview image data generated from the image data by the image forming apparatus 100.

The storage unit 130 is an auxiliary storage device, such as a hard disk drive, that stores data and programs. The document box area 130a includes a plurality of document boxes for each user. Each document box stores image data managed by the user.

The operation panel 140 is a liquid crystal panel that displays an operation screen, an image of image data, and a preview image of preview image data, and accepts the operation by the user.

The operation panel processor 150 executes: the process for displaying the operation items of the function provided in the image forming apparatus 100 on the operation panel 140; the process for displaying an image and a preview image on the operation panel 140; or the process for inputting the operation by the user from the operation panel 140.

When the user performs a read operation from the operation panel 140, the document reading unit 160, such as a document scanner, reads the document set on the platen of the image forming apparatus 100 and then outputs the read data to the image processor 170.

When the image processor 170 receives an input of the data read from the document reading unit 160, the image processor 170 converts the data into the image data of a printable image or the image data of an image transmittable by FAX or via e-mail.

The short-range wireless communication unit 180 is a circuit that directly communicates with the portable terminal 200 in a close range using Bluetooth (registered trademark) as a short-range wireless communication standard or infrared communication.

The network communication unit 190 is a circuit including a attachable LAN interface, and connects to the network 400.

Next, a description will be given of the functional configuration of the portable terminal 200. The portable terminal 200 illustrated in FIG. 2 includes a control unit 210, a memory unit 220, an operation panel 230, an operation panel processor 240, a three-axis acceleration sensor unit 250, a short-range wireless communication unit 260, and a network communication unit 270. These units are connected to one another via a bus or similar member in the configuration. The control unit 210 includes a preview-image-request processor 210a and a preview-image display processing unit 210b. The memory unit 220 includes a preview-image-data storage area 220a.

The control unit 210 is a circuit including a main storage unit, such as a RAM and a ROM, and a control unit such as a central processing unit (CPU). The control unit 210 performs an overall control of the portable terminal 200, including an interface such as various I/Os and a universal serial bus (USB), a bus controller, and similar member. When the preview-image-request processor 210a (which is also referred to as preview-image-data receiving unit) transmits a preview-image request notification to the image forming apparatus 100 and receives preview image data from the image forming apparatus 100, the preview-image-request processor 210a stores the preview image data in the preview-image-data storage area 220a. The preview-image display processing unit 210b (which is also referred to as preview-image display unit) takes the preview image data from the preview-image-data storage area 220a and displays the image of the preview image data on the operation panel 230. The detail of a preview-image display process executed by the preview-image display processing unit 210b will be described later.

The memory unit 220 is an auxiliary storage device, such as a flash memory, and stores the program and the data of the process to be executed by the control unit 210. The preview-image-data storage area 220a stores the preview image data received from the image forming apparatus 100.

The operation panel 230 is a liquid crystal panel that displays an operation screen, an image of image data, and a preview image of preview image data, and accepts the operation by the user.

The operation panel processor 240 executes: the process for displaying the operation items of the function provided in the portable terminal 200 on the operation panel 230; the process for displaying an image and a preview image on the operation panel 230; or the process for inputting the operation by the user from the operation panel 230.

The three-axis acceleration sensor unit 250 (which is also referred to as rotation detecting circuit) is a micro electro mechanical system (MEMS) sensor that detects the respective accelerations in the XYZ-axis directions so as to detect the motion such as tilting of the portable terminal 200.

The short-range wireless communication unit 260 is a circuit that directly communicates with the image forming apparatus 100 in a close range using Bluetooth (registered trademark) as a short-range wireless communication standard or infrared communication.

The network communication unit 270 is a circuit that connects to the network 400 via the access point 300. The network communication unit 270 also connects to the Internet network 600 via the access point 700.

Figure 3A:
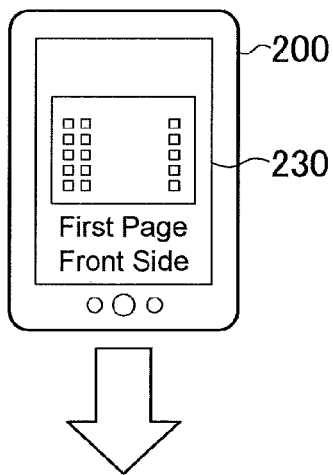
FIGS. 3A to 3D illustrate an operation procedure for displaying a preview image of the back side in duplex printing according to the embodiment.
Figure 3B:
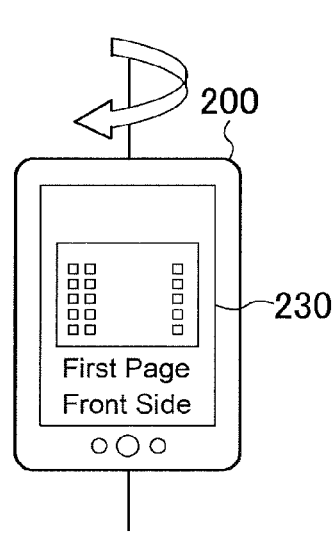
Figure 3C:
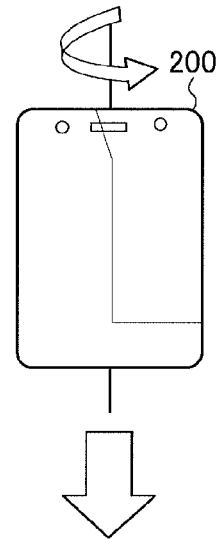
Figure 3D:
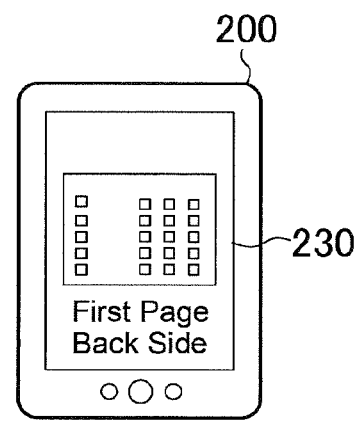

Next, a description will be given of the operation for displaying the preview images of the front side and the back side in duplex printing according to the embodiment using FIGS. 3A to 3D. The operation panel 230 of the portable terminal 200 illustrated in FIG. 3A displays the preview image of the front side of the first page in duplex printing. While the portable terminal 200 is in this state, when the user horizontally rotates the portable terminal 200 as illustrated in FIG. 3B such that the back side faces the front, this operation causes the back side of the portable terminal 200 to face the front. That is, the portable terminal 200 faces the opposite side to the front. Subsequently, when the user horizontally rotates the portable terminal 200 as illustrated in FIG. 3C such that the front side faces the front, this operation causes the front side of the portable terminal 200 to face the front. With this sequence of operations, the operation panel 230 of the portable terminal 200 displays the preview image of the back side of the first page in duplex printing. To display not the first page but the preview image of the back side of the page specified by the user, firstly, the user displays the preview image of the front side of the page specified by the user. Subsequently, the user performs the identical operation as that performed when the preview image of the back side of the first page. This causes displaying the preview image of the back side of the page specified by the user. The rotation procedure illustrated in FIGS. 3A to 3D is in a factory default state. The setting of the rotation procedure is stored in the memory unit 220 or the control unit 210, and can be changed by the user via the operation panel.

Next, a description will be given of the procedure for displaying the preview images of the front side and the back side of the page in duplex printing on the operation panel 230 of the portable terminal 200 for more detail using flowcharts of FIGS. 4A and 4B.

Firstly, when the user performs the operation for displaying a preview image from the operation panel 230 of the portable terminal 200, the operation panel processor 240 outputs a display request notification of the preview image to the control unit 210. When the control unit 210 receives an input of the display request notification of the preview image, the control unit 210 activates the preview-image-request processor 210a. Subsequently, the preview-image-request processor 210a transmits the preview-image request notification to the image forming apparatus 100. When the preview-image-request processor 210a receives preview image data from the image forming apparatus 100, the preview-image-request processor 210a stores the preview image data in the preview-image-data storage area 220a. Subsequently, when the control unit 210 detects the termination of the preview-image requesting process in the preview-image-request processor 210a, the control unit 210 activates the preview-image display processing unit 210b. Subsequently, the preview-image display processing unit 210b starts the preview-image display process. The following describes the preview-image display process illustrated in FIGS. 4A and 4B in the order of the steps in the flowchart.

Firstly, as shown in FIG. 4A, at step S101, the preview-image display processing unit 210b takes the preview image data from the preview-image-data storage area 220a.

Subsequently, at step S102, the preview-image display processing unit 210b sets an initial value (=1) to display-page-number data to which the page number of the preview image to be displayed is set.

Subsequently, at step S103, the preview-image display processing unit 210b takes out the preview image data corresponding to the display page number set to the display-page-number data, from the preview image data taken in step S101. At this time, from the page in duplex printing, the preview image data of the front side is taken out.

Subsequently, at step S104, the preview-image display processing unit 210b (which also function as duplex-printing-flag determination unit) determines whether the duplex printing flag of the preview image data taken out in step S103 is set. When the duplex printing flag is set (Yes in step S104), the process proceeds to step S105. When the duplex printing flag is not set (No in step S104), the process proceeds to step S106.

In the case of "Yes" in step S104, the preview-image display processing unit 210b (which also function as composite-image display unit) causes the operation panel processor 240 to display a composite image on the operation panel 230 at step S105. The composite image is composed of the image data of an icon indicating that the preview image data of the back side can be displayed and the preview image data taken out in step S103.

In the case of "No" in step S104, the preview-image display processing unit 210b causes the operation panel processor 240 to display the image of the preview image data taken out in step S103 on the operation panel 230 at step S106.

Figure 4B:
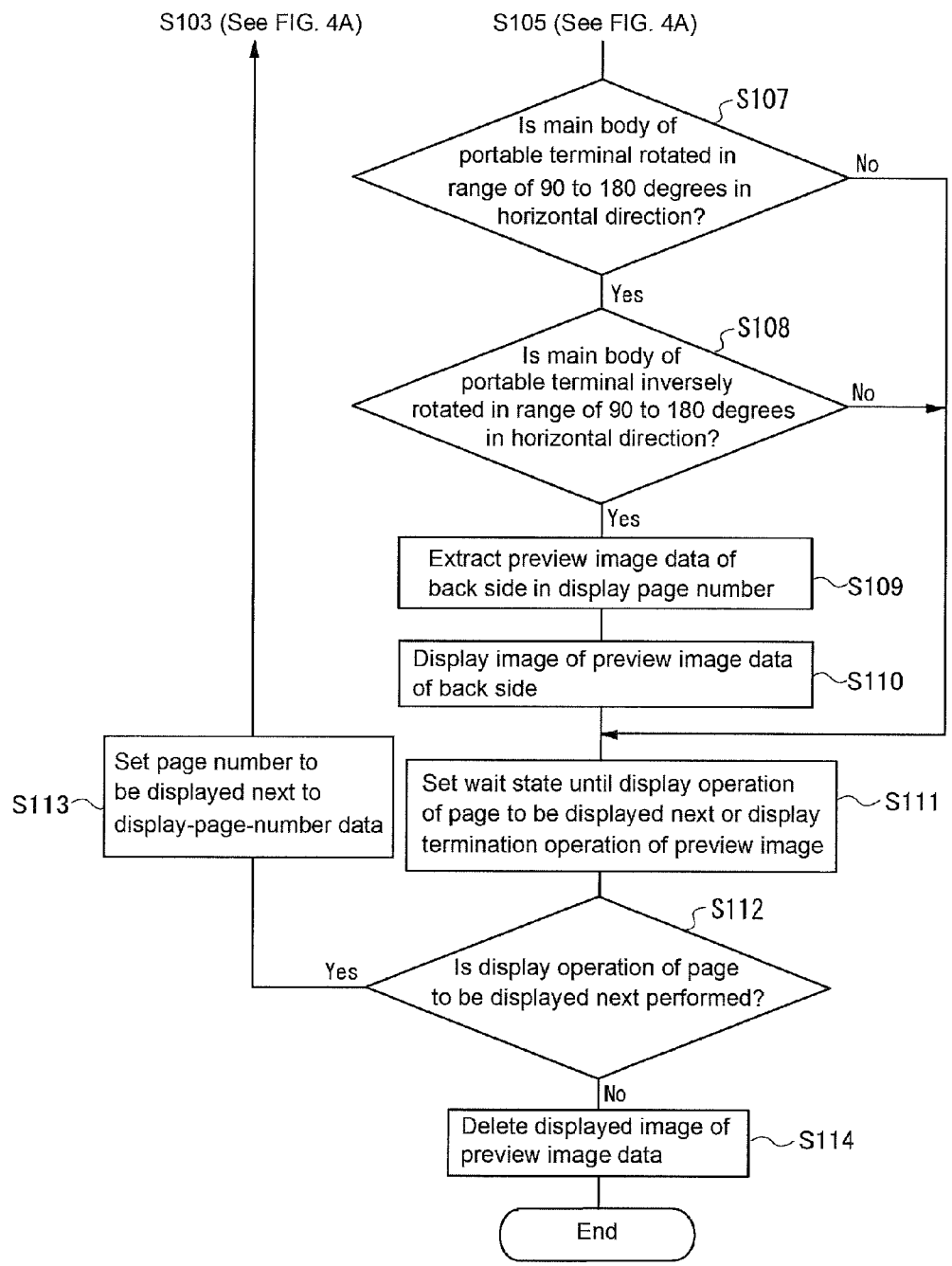

Next, as shown in FIG. 4B, at step S107, the preview-image display processing unit 210b determines whether the main body of the portable terminal 200 is rotated in a range of 90 degrees to 180 degrees in the horizontal direction within a specific time period using the three-axis acceleration sensor unit 250. When the main body of the portable terminal 200 is rotated (Yes in step S107), the process proceeds to step S108. When the main body of the portable terminal 200 is not rotated (No in step S107), the process proceeds to step S111. Here, the specific time period is any settable time period.

In the case of "Yes" in step S107, the preview-image display processing unit 210b determines, at step S108, whether the main body of the portable terminal 200 is rotated in a range of 90 degrees to 180 degrees within a specific time period in the opposite direction to the direction detected in step S107 using the three-axis acceleration sensor unit 250. When the main body of the portable terminal 200 is inversely rotated (Yes in step S108), the process proceeds to step S109. When the main body of the portable terminal 200 is not inversely rotated (No in step S109), the process proceeds to step S111.

Subsequently, at step S109, the preview-image display processing unit 210b takes out the preview image data of the back side corresponding to the display page number of the display-page-number data from the preview image data taken in step S101.

Subsequently, at step S101, the preview-image display processing unit 210b causes the operation panel processor 240 to display the image of the preview image data, which is taken out in step S109, of the back side on the operation panel 230.

After "No" in step S107, "No" in step S108, or step S110, the preview-image display processing unit 210b becomes, at step S111, a wait state until a display operation of the page to be displayed next or a display termination operation of the preview image is performed. When the display operation of the page to be displayed next or the display termination operation of the preview image is performed, the process proceeds to step S112.

Subsequently, at step S112, the preview-image display processing unit 210b determines whether the display operation of the page to be displayed next is performed through the operation panel 230. When the display operation of the page to be displayed next is performed (Yes in step S112), the process proceeds to step S113. When not the display operation of the page to be displayed next but the display termination operation of the preview image is performed (No in step S112), the process proceeds to step S114.

In the case of "Yes" in step S112, the preview-image display processing unit 210b sets the page number to be displayed next to the display-page-number data at step S113, the process returns to step S103, as shown in FIG. 4A.

In the case of "No" in step S112, the preview-image display processing unit 210b deletes the displayed image of the preview image data on the operation panel 230 at step S114, and the preview-image display process terminates.

According to the above-described configuration, the user performs the operation to cause the back side of the portable terminal 200 to face the front in the horizontal direction while holding the portable terminal 200 with one hand. Subsequently, the user performs the operation to cause the front side of the portable terminal 200 to the front in the horizontal direction. This causes displaying the preview image of the back side of the page in duplex printing on the operation panel 230. That is, when images are printed on both sides on a paper sheet, performing an operation similarly to the operation to see the back side of the paper sheet allows the user to confirm the preview image of the back side of the page in duplex printing with one hand. After the user confirms the preview image as just described, issuing a print request of the original image data corresponding to the preview image through the portable terminal 200 prevents an incorrect print job (erroneous copying) by a mistake of print setting or similar problem in advance.

Here, in the preview-image display process illustrated in FIGS. 4A and 4B according to the embodiment, it is determined whether the duplex printing flag of the preview image data is set to determine whether there is an image on the back side. Only when there is an image on the back side, the preview image of the back side is displayed. This, however, should not be construed in a limiting sense. For example, when the user performs the operation to display the back side while the duplex printing flag is not set because duplex printing is not performed, the image of a blank sheet may be displayed. As just described, displaying the image of the blank sheet allows the user to confirm that duplex printing is not performed as if the user confirms the paper sheet.

In the preview-image display process illustrated in FIGS. 4A and 4B in the embodiment, the wait state is set until the display operation of the page to be displayed next or the display termination operation of the preview image is performed after the preview image of the back side of the page is displayed. This, however, should not be construed in a limiting sense. For example, in the wait state, when the user performs the identical operation as the operation to display the preview image of the back side of the page as illustrated in FIGS. 3A to 3D, the state where the preview image of the back side is displayed may be changed to the state where the preview image of the front side is displayed.

In the embodiment, the image forming apparatus 100 and the portable terminal 200 are connected by the network 400, and the portable terminal 200 receives the preview image data from the image forming apparatus 100 through the network 400. This, however, should not be construed in a limiting sense. For example, the image forming apparatus 100 and the portable terminal 200 may be connected by the short-range wireless communication unit 180 of the image forming apparatus 100 and the short-range wireless communication unit 260 of the portable terminal 200 with a short-range wireless communication such that the portable terminal 200 receives the preview image data from the image forming apparatus 100 with the short-range wireless communication. Also, the image forming apparatus 100 and the portable terminal 200 may be connected by the Internet network 600 such that the portable terminal 200 receives the preview image data from the image forming apparatus 100 using the communication protocol of the Internet network 600.

In the embodiment, the image forming apparatus 100 generates the preview image data from the image data. This, however, should not be construed in a limiting sense. For example, the portable terminal 200 may generate the preview image data from the image data so as to display the preview image.

The preview-image display process illustrated in FIGS. 4A and 4B according to the embodiment employs the "rotation in a range of 90 degrees to 180 degrees in the horizontal direction" in step S107 and the "rotation in a range of 90 degrees to 180 degrees in the opposite direction" in step S108. However, the direction and the angle are not limited to these. For example, the direction may be not only the horizontal direction but also an obliquely horizontal direction. The angle may be in a narrower angle range or a wider angle range than the range of 90 degrees to 180 degrees. Further, for each portable terminal 200, the direction and the angle range may be set to different values.

These image forming system, portable terminal, and image display program according to the disclosure cause displaying the preview image of the back side of the page in duplex printing simply with one hand.

The image forming system, portable terminal, and image display program according to the disclosure are applicable to a portable terminal that can display the image of the preview image data and to any system that includes this type of portable terminal.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system, comprising:
an image forming apparatus; and
a portable terminal,
wherein the image forming apparatus includes a first processor that operates, when the first processor executes program instructions, as:
    a preview-image-data generating circuit that performs processing to generate preview image data from image data;
    a preview-image-data transmitting circuit that performs processing to transmit the preview image data to the portable terminal; and
    a duplex-printing-flag setting circuit that performs processing to set a duplex printing flag to the image data in duplex printing as a setting,
the portable terminal includes a second processor that operates, when the second processor executes program instructions, as:
    a preview-image-data receiving circuit that performs processing to receive the preview image data from the image forming apparatus via wireless communication;
    a preview-image display circuit that performs processing to display an image of the preview image data;
    a rotation detecting circuit that performs processing to detect rotation of a main body of the portable terminal with a predetermined rotation procedure;
    a duplex-printing-flag determination circuit that performs processing to determine whether the duplex printing flag is set; and
    a composite-image display circuit that performs processing to display a composite image comprising: image data of an icon indicating that preview image data of a back side of the displayed image is available to be displayed; and the preview image data, when the duplex printing flag is set to the image data, wherein
when the rotation detecting circuit performs processing to detect rotation of the main body of the portable terminal while the image of the preview image data is displayed, the portable terminal displays an image of the preview image data corresponding to the back side of the displayed image.

2. The image forming system according to claim 1,
wherein the rotation detected by the rotation detecting circuit corresponds to a sequence of operations of:
    horizontally rotating the portable terminal so as to cause the back side of the main body of the portable terminal to face a front; and
    horizontally rotating the main body of the portable terminal facing an opposite side of the front so as to cause a front side of the main body of the portable terminal to face the front.

3. The image forming system according to claim 1,
wherein the image forming apparatus and the portable terminal are connected by a network.

4. The image forming system according to claim 1,
wherein the image forming apparatus and the portable terminal are connected by a short-range wireless communication.

5. The image forming system according to claim 1,
wherein the image forming apparatus and the portable terminal are connected by the Internet network.

6. A portable terminal for displaying an image according to image data received from an image forming apparatus, comprising a processor that operates, when the processor executes program instructions, as:
    an image-data receiving circuit that performs processing to receives image data from the image forming apparatus;
    a preview-image-data generating circuit that performs processing to generates preview image data from the image data;
    a preview-image display circuit that performs processing to displays an image of the preview image data;
    a rotation detecting circuit that performs processing to detects rotation of a main body of the portable terminal with a predetermined rotation procedure;
    a duplex-printing-flag determination circuit that performs processing to determine whether a duplex printing flag is set to the image data to which the duplex printing flag is set in duplex printing; and
    a composite-image display circuit that performs processing to display a composite image comprising: image data of an icon indicating that preview image data of a back side of the displayed image is available to be displayed; and the preview image data, when the duplex printing flag is set to the image data,
wherein when the rotation detecting circuit performs processing to detects rotation of the main body of the portable terminal while the image of the preview image data is displayed, the portable terminal displays an image of the preview image data corresponding to the back side of the displayed image.

7. The portable terminal according to claim 6,
wherein the rotation detected by the rotation detecting circuit corresponds to a sequence of operations of:
    horizontally rotating the portable terminal so as to cause the back side of the main body of the portable terminal to face a front; and
    horizontally rotating the main body of the portable terminal facing an opposite side of the front so as to cause a front side of the main body of the portable terminal to face the front.

8. A non-transitory computer-readable recording medium storing an image display program, the image display program causing a processor of a portable terminal to operates, when the processor executes the image display program, as:
    a data receiving circuit that performs processing to receives preview image data or image data from an image forming apparatus via wireless communication;
    a preview-image-data generating circuit that performs processing to generates preview image data from the image data corresponding to reception of the image data;
    a preview-image display circuit that performs processing to displays an image of the preview image data; and
    a rotation detecting circuit that performs processing to detects rotation of a main body of the portable terminal with a predetermined rotation procedure;
    a duplex-printing-flag determination circuit that performs processing to determine whether a duplex printing flag is set to the image data to which the duplex printing flag is set in duplex printing; and
    a composite-image display circuit that performs processing to display a composite image comprising: image data of an icon indicating that preview image data of a back side of the displayed image is available to be displayed; and the preview image data, when the duplex printing flag is set to the image data, wherein when the rotation detecting circuit performs processing to detect rotation of the main body of the portable terminal while the image of the preview image data is displayed, the portable terminal displays an image of the preview image data corresponding to the back side of the displayed image.

* * * * *